United States Patent Office 3,094,809
Patented June 25, 1963

3,094,809
TREATING SOILS TO REDUCE EROSION
John J. Kaufman, New Brighton, and Philip R. Templin, Oakmont, Pa., assignors to Gulf Research & Development Company, Pittsburgh, Pa., a corporation of Delaware
No Drawing. Filed Aug. 23, 1960, Ser. No. 51,296
2 Claims. (Cl. 47—9)

This invention relates to the control of soil erosion. More particularly it relates to the control of soil erosion by applying to the soil aqueous wax compositions adapted to form a protective coating on the soil which resists the erosive effects of wind or water.

The erosion of soils is a serious problem in many areas and considerable effort is made to find means for satisfactorily reducing or minimizing the soil erosion. Soil erosion is often the cause of crop losses which may total many thousands of dollars. In certain areas such as the plains States of Nebraska and Kansas which have relatively flat terrain, wind is a principal cause of soil erosion. In other areas which have a hilly terrain, soil erosion is caused by the washing effect of rain water. The desirability of preventing oil erosion from either wind or water is thus apparent.

In accordance with the present invention, soil erosion is minimized by applying to the soil a protective coating of an aqueous wax composition adapted to bind the soil and to resist the erosive effects of wind and water. In addition to preventing erosion of the soil, the protective soil coating, comprising the aqueous wax composition, effectively reduces the evaporation of moisture from the soil while at the same time permitting sunlight, oxygen, nitrogen, and moisture needed for seed germination to contact the soil.

A wide variety of aqueous wax emulsions can be employed to form the protective coating on the soil surface in accordance with the invention. The term "wax" as used herein will be understood to include not only the naturally occurring materials composed largely of fatty acid esters of higher molecular weight monohydric alcohols such as carnauba, candelilla, and beeswax, but also other organic water-insoluble materials which have the physical character of waxes. The waxes thus fall into three general categories, namely, ester waxes which usually are naturally occurring either as plant exudations or animal excreta; the hydrocarbon waxes often referred to as mineral waxes including montan, ozokerite, ceresin, microcrystalline, petrolatum, and paraffin; and synthetic polymeric waxes such as polyethylene, polypropylene, Fischer-Tropsch, and silicon waxes.

The aqueous wax emulsions employed in accordance with the invention are prepared by dispersing a wax selected from any of the type mentioned above in water. Emulsifying agents such as triethanolamine stearate, monoethanolamine stearate, morpholine, ammonium laurate, ammonium stearate, ammonium linoleate, and petroleum sulfonates can be employed to assist in emulsification of the mixture. As is known in the art of wax emulsion formulation, other materials such as phospholipids, alginates, vegetable gums, cellulose derivatives, carageenin, finely divided solids such as bentonite and powdered silica and the like can also be employed in the wax composition to improve the stability or other properties of the wax emulsion. One typical preferred aqueous wax composition for use in accordance with the invention has the following composition:

| | Percent |
|---|---|
| Triethanolamine | 2.1 |
| Paraffin wax | 10.4 |
| Polyethylene | 2.5 |
| Polyisobutylene | 2.5 |
| Carnauba wax | 1.0 |
| Stearic acid | 4.6 |
| Water | 76.9 |

The aqueous wax coating is applied to the soil by any convenient means to form a surface layer of any desired thickness. Spraying is probably the most convenient method of applying the coating, and the aqueous wax compositions disclosed herein are eminently suited to this method of application. The thickness and composition of the soil coating and the amount of wax present therein are governed to a great extent by the character of the soil and the physical conditions prevailing in the particular area in which the wax composition is to be employed. Thus, for example, in very arid regions in which strong winds are encountered or on steep slopes it is preferable to apply a greater amount of wax to the soil. In contrast, when the erosive effects of wind and rain are less severe and for greater economy lesser amounts of wax can be applied to the soil. It has been determined however that the rate of evaporation of soil moisture is decreased by increasing the amount of wax applied to the soil, and therefore, particularly in arid regions where it is most desired to prevent loss of moisture, it is preferred to employ wax compositions containing relatively high amounts of wax. Additional coatings may be applied to reinforce or to supplement the earlier coatings if desired. Aqueous wax emulsion compositions containing from about 0.001 to 1.0 gram of wax per milliliter of liquid are generally satisfactory for use in the present invention, although in some instances both greater and lower amounts of wax can be used.

The advantages realized by applying to soils a protective coating of an aqueous wax emulsion in accordance with the present invention are clearly shown in the following examples.

EXAMPLE I

A clay-type subsoil was pulverized in a hammer mill using a ⅛ inch screen. To the clay soil was then added 20–30 mesh Ottawa sand in an amount sufficient to produce a 50–50 mixture of clay soil and sand. This soil-sand mixture was placed in trays which were approximately one inch deep and one square foot in area. The soil surface was made as smooth and level as possible without packing. The soil surfaces were then sprayed with the aqueous wax compositions listed below. The spraying was accomplished using a DeVilbiss spray gun at a pressure of 20 pounds. The sprayed soil specimens were permitted to stand quiescent for 48 hours at a temperature of 95° to 100° F. before testing. The aqueous wax compositions employed in these tests had the following make-up:

| Make-up, percent by weight | Wax composition | | | | | |
|---|---|---|---|---|---|---|
| | A | B | C | D | E | F |
| Paraffin wax (133 A.M.P.) | 10.4 | | | | | |
| Polyethylene | 2.5 | | | | | |
| Polyisobutylene | 2.5 | | | | | |
| Microcrystalline wax | | 15.4 | 16.4 | 15.7 | 15.9 | |
| Petrolatum wax | | | | | | 15.9 |
| Carnauba wax | 1.0 | 1.0 | | | | |
| Stearic acid | 4.6 | 4.6 | 4.6 | 4.2 | 3.2 | 3.2 |
| Triethanolamine | 2.1 | 2.1 | 2.1 | 1.7 | 1.4 | 1.4 |
| Water | 76.9 | 76.9 | 76.9 | 78.4 | 79.5 | 79.5 |

To test the effect of the aqueous wax compositions on soil erosion caused by air, a stream of air having a velocity of about 2000 ft. per minute (Pitot tube measurement) was directed parallel to the soil surface from a point 9 inches in front of the specimen and 1½ inches above its surface. The test conditions and results obtained are summarized in Table I.

Table I

| Wax composition applied to soil | Wax deposited on soil, gms./sq. ft. | Exposure time, minutes | Soil loss (erosion), percent by weight of test sample |
|---|---|---|---|
| Composition A | 3.4 | 3 | 0 |
| Do | 1.7 | 3 | 0 |
| Do | 1.3 | 3 | 0 |
| Do | 1.1 | 3 | 0 |
| Do | 0.9 | 3 | 25 |
| Composition B | 1.1 | 1 | 0 |
| Do | 0.9 | 1 | 0 |
| Do | 0.6 | 1 | 0 |
| Composition C | 1.2 | 1 | 0 |
| Do | 0.6 | 1 | 0 |
| Composition D | 1.1 | 1 | 24 |
| Composition E | 1.2 | 1 | 24 |
| Composition F | 2.0 | 1 | 35 |
| Do | 1.6 | 1 | 11 |
| Do | 1.2 | 1 | 1 |
| No treatment | 0 | 3 | 40 |

As seen from the above data, the application of the aqueous wax compositions to the soil substantially reduced the erosive effect of the air.

As mentioned previously, the aqueous wax compositions when applied to soils in accordance with the invention effectively retard evaporation of moisture from the soil and serve to maintain the soil in a soft, moist condition which promotes germination and sprouting of seeds. The wax coatings employed in the invention retard moisture evaporation from the soil without forming a waterproof coating on the soil surfaces which would prevent needed moisture from reaching the soil.

EXAMPLE II

The following procedure was carried out to determine the effect of the wax coating on the rate of evaporation of moisture from the soil and its effect on the germination of seeds in the soil. A number of soil specimens, each having an area of 5.9 square inches, were sprayed with 50 milliliters of various aqueous wax compositions. The amount of water evaporation was determined over a period of 12 days by measuring the moisture remaining in the soil. A known number of corn kernels were planted in the soil test specimens and the seed germination over the same 12-day period observed. The test results are shown in the following Table II. In Table II, "A" indicates the percentage of water lost from the soil due to evaporation and "B" indicates the percentage of seed germination.

The data presented above show that the aqueous wax coating applied to soil surfaces reduces or retards evaporation of moisture from the soil and hastens the germination of seeds present in the soil.

The application of a protective coating of an aqueous wax composition to soils in accordance with the present invention offers numerous advantages with respect to reduction of soil erosion, retention of moisture in the soil, acceleration of seed germination, etc. The aqueous wax compositions employed in accordance with the invention can be applied to soils by spraying or other convenient means utilizing available equipment and can be applied uniformly over a given surface area without fear of the wax coating interfering with or preventing the sprouting of plants. Furthermore, the aqueous wax compositions disclosed herein form a coating on the soil surface which permits oxygen, nitrogen, and moisture needed for seed germination to reach the soil. The aqueous wax coatings do not obstruct the passage of sunlight or ultraviolet radiation, thereby permitting sunlight to contact the soil so as to prevent the formation of undesirable bacteria and molds within the soil.

Those modifications and equivalents which fall within the spirit of the invention and the scope of the appended claims are to be considered part of the invention.

We claim:

1. A process for treating soils to reduce erosion thereof without excluding sunlight, oxygen, nitrogen and moisture needed for seed germination which comprises applying on the surface of the soil a small amount, sufficient to form a porous coating on the surface of the soil, of an aqueous wax emulsion composition having the following make-up:

| | Percent |
|---|---|
| Triethanolamine | 2.1 |
| Paraffin wax | 10.4 |
| Polyethylene | 2.5 |
| Polyisobutylene | 2.5 |
| Carnauba wax | 1.0 |
| Stearic acid | 4.6 |
| Water | 76.9 |

2. The process according to claim 1 in which said aqueous wax emulsion composition is applied in an amount of about 10 to about 42 grams per square foot of soil surface.

(References on following page)

Table II

| Wax composition | Percent by weight | Wax composition deposited, gms./sq. ft. | 1 day, A | 2 days, A | 5 days A | 5 days B | 6 days A | 6 days B | 7 days A | 7 days B | 8 days, A | 12 days, A |
|---|---|---|---|---|---|---|---|---|---|---|---|---|
| G (make-up): | | | | | | | | | | | | |
| Microcrystalline wax #1 | 15.4 | 0 | 23 | 45 | 67 | 0 | 71 | 0 | 74 | 0 | 78 | 87 |
| Carnauba wax | 1.0 | 10 | 24 | 43 | 62 | 33 | 66 | 33 | 70 | 33 | 75 | 84 |
| Stearic acid | 4.6 | 20 | 16 | 35 | 57 | 0 | 60 | 0 | 64 | 0 | 68 | 78 |
| Triethanolamine | 2.1 | 32 | 15 | 32 | 56 | 33 | 60 | 33 | 64 | 33 | 68 | 79 |
| Water | 76.9 | 42 | 16 | 35 | 54 | 100 | 58 | 100 | 59 | 100 | 65 | 77 |
| H (make-up): | | | | | | | | | | | | |
| Microcrystalline wax #1 | 16.4 | 0 | 23 | 45 | 64 | 33 | 69 | 33 | 72 | 33 | 77 | 87 |
| Carnauba wax | 0.0 | 10 | 22 | 41 | 60 | 0 | 64 | 0 | 68 | 0 | 72 | 82 |
| Stearic acid | 4.6 | 20 | 19 | 39 | 60 | 67 | 63 | 67 | 67 | 67 | 70 | 81 |
| Triethanolamine | 2.1 | 32 | 16 | 35 | 58 | 100 | 62 | 100 | 67 | 100 | 71 | 83 |
| Water | 76.9 | 42 | 16 | 28 | 52 | 67 | 57 | 67 | 61 | 67 | 64 | 75 |
| I (make-up): | | | | | | | | | | | | |
| Microcrystalline wax #2 | 15.4 | 0 | 24 | 46 | 67 | 0 | 68 | 0 | 77 | 0 | 81 | 89 |
| Carnauba wax | 1.0 | 10 | 20 | 38 | 57 | 33 | 61 | 33 | 65 | 33 | 70 | 79 |
| Stearic acid | 4.6 | 20 | 19 | 38 | 58 | 0 | 62 | 0 | 66 | 0 | 70 | 81 |
| Triethanolamine | 2.1 | 32 | 17 | 36 | 59 | 0 | 65 | 0 | 68 | 0 | 71 | 84 |
| Water | 76.9 | 42 | 17 | 36 | 56 | 33 | 59 | 33 | 63 | 33 | 66 | 77 |
| J (make-up): | | | | | | | | | | | | |
| Petrolatum wax #1 | 15.4 | 0 | 25 | 45 | 64 | 0 | 69 | 0 | 73 | 0 | 78 | 87 |
| Carnauba wax | 1.0 | 10 | 20 | 38 | 58 | 33 | 62 | 33 | 66 | 33 | 71 | 81 |
| Stearic acid | 4.6 | 20 | 15 | 31 | 51 | 67 | 56 | 100 | 60 | 100 | 65 | 76 |
| Triethanolamine | 2.1 | 32 | 15 | 30 | 51 | 33 | 56 | 33 | 61 | 33 | 67 | 79 |
| Water | 76.9 | 42 | 15 | 25 | 43 | 100 | 49 | 100 | 55 | 100 | 59 | 74 |
| K (make-up): | | | | | | | | | | | | |
| Petrolatum wax #2 | 15.4 | 0 | 28 | 48 | 68 | 0 | 72 | 0 | 76 | 0 | 81 | 90 |
| Carnauba wax | 1.0 | 10 | 18 | 35 | 56 | 33 | 60 | 33 | 65 | 33 | 71 | 82 |
| Stearic acid | 4.6 | 20 | 14 | 29 | 51 | 67 | 55 | 67 | 60 | 67 | 63 | 74 |
| Triethanolamine | 2.1 | 32 | 14 | 25 | 45 | 33 | 51 | 67 | 56 | 67 | 63 | 76 |
| Water | 76.9 | 42 | 14 | 26 | 43 | 33 | 49 | 33 | 54 | 33 | 58 | 71 |

References Cited in the file of this patent

UNITED STATES PATENTS

| | | |
|---|---|---|
| 1,544,990 | Johnson | July 7, 1925 |
| 1,882,377 | Whittelsey | Oct. 11, 1932 |
| 2,961,799 | Coe | Nov. 29, 1960 |

FOREIGN PATENTS 563,387   Belgium _____ Jan. 15, 1958
(Corresponding U.S.—Gaeth 2,945,322, July 19, 1960.)

OTHER REFERENCES

"Condensed Chemical Dictionary," fifth edition, published by Reinhold (N.Y.) 1956. Pages 228, 229, 431, 822, 878, 879, 880, 881, 1030, 1114, 1118.

"The Power Plant," vol. 16, No. 15, published by Pratt and Whitney Aircraft. (East Hartford, Conn.), Aug. 20, 1959. Four pages in all. Only pages 1, 3, 4 relied on.